Jan. 25, 1927. 1,615,372
W. J. FIEGEL
MACHINE FOR BORING BEARINGS AND THE LIKE
Filed April 30, 1923 4 Sheets-Sheet 1
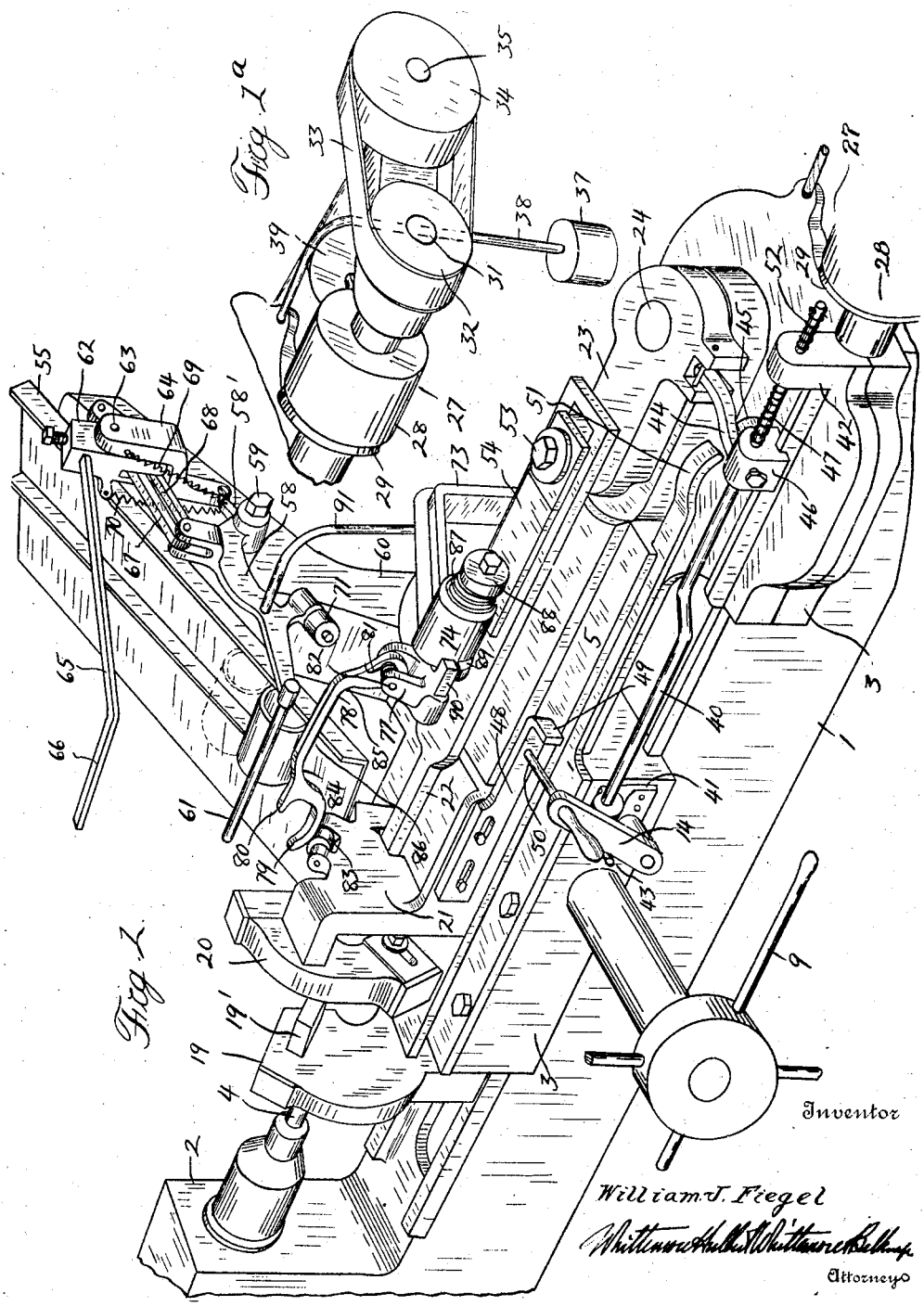
Inventor
William J. Fiegel
Attorneys

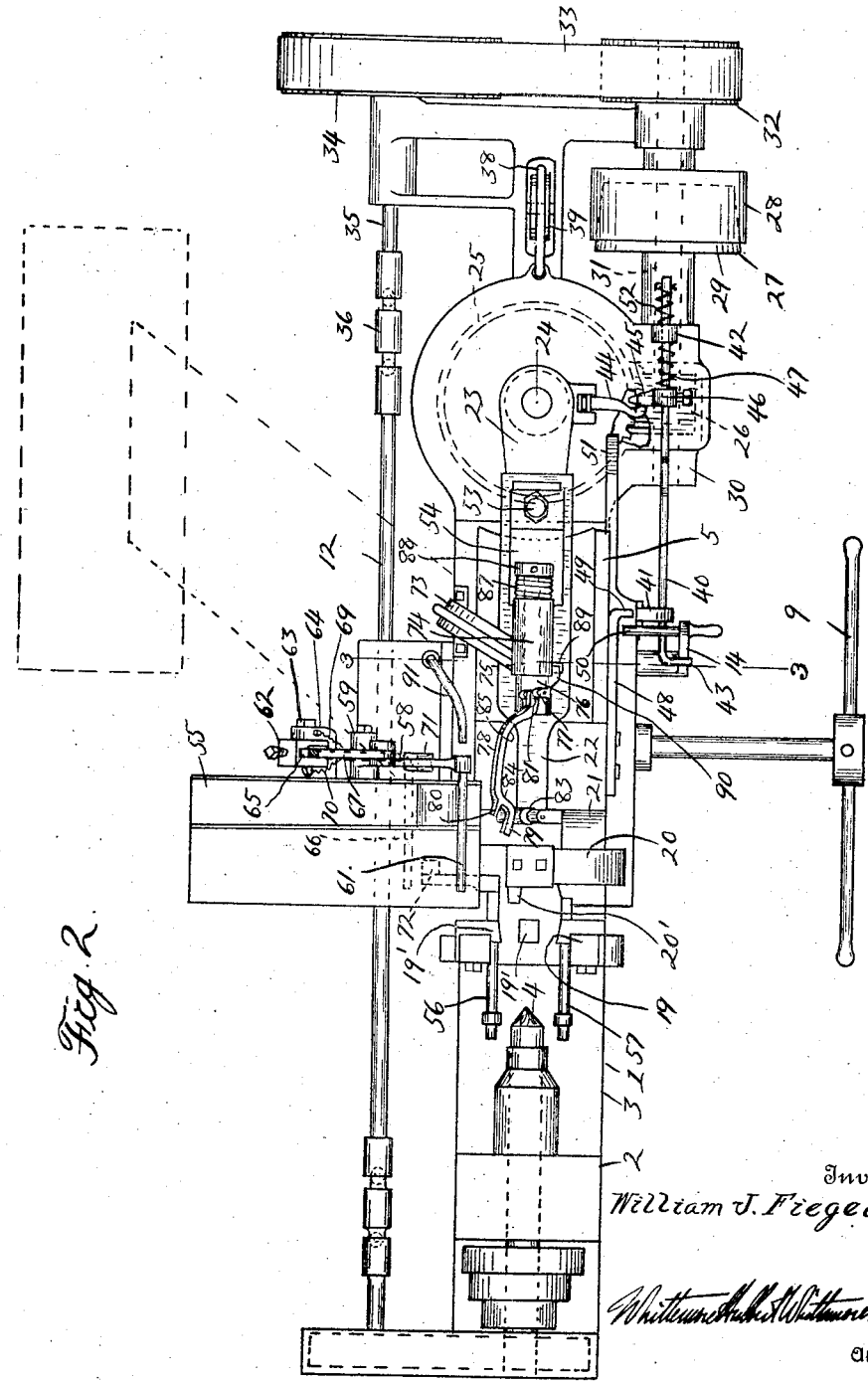

Jan. 25, 1927.  
W. J. FIEGEL  
1,615,372  
MACHINE FOR BORING BEARINGS AND THE LIKE  
Filed April 30, 1923  4 Sheets-Sheet 3
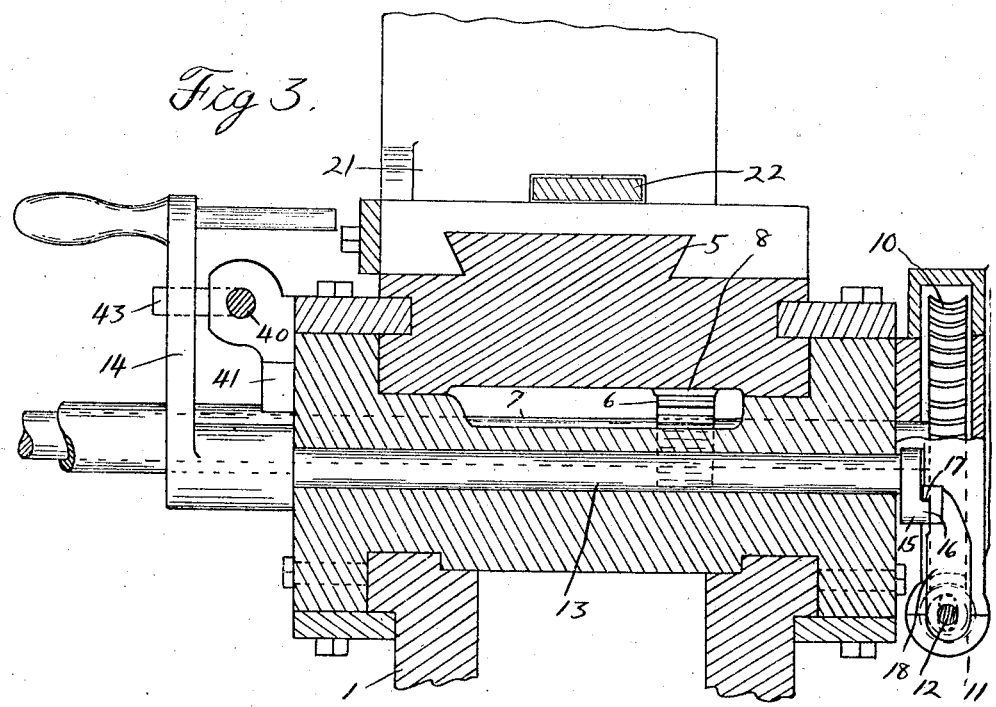
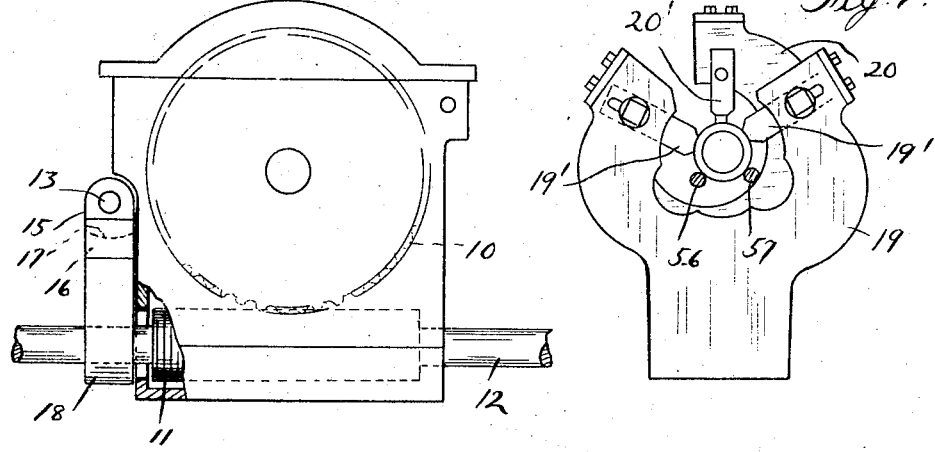
Inventor  
William J. Fiegel Jan. 25, 1927. 1,615,372
W. J. FIEGEL
MACHINE FOR BORING BEARINGS AND THE LIKE
Filed April 30, 1923   4 Sheets-Sheet 4
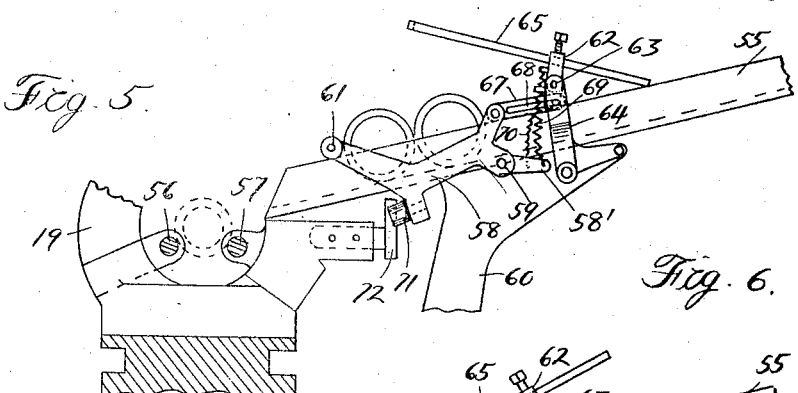
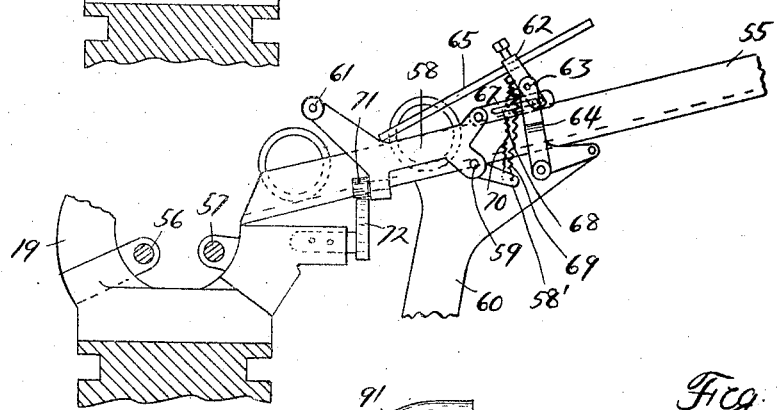
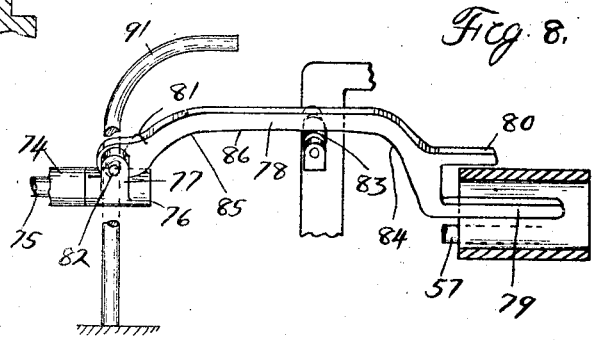
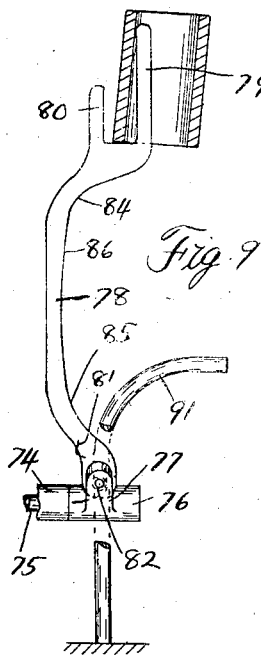
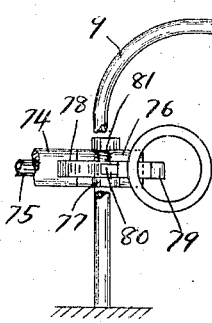
Inventor
William J. Fiegel
By Whittemore Hulbert Whittemore Belknap
Attorneys Patented Jan. 25, 1927.

1,615,372

UNITED STATES PATENT OFFICE.

WILLIAM J. FIEGEL, OF DETROIT, MICHIGAN, ASSIGNOR, BY MESNE ASSIGNMENTS, TO BOHN ALUMINUM & BRASS CORPORATION, A CORPORATION OF MICHIGAN.

MACHINE FOR BORING BEARINGS AND THE LIKE.

Application filed April 30, 1923. Serial No. 635,647.

The invention relates to machines for operating upon bearings and the like and refers more particularly to machines for boring bearings. The invention has for its main object the provision of a machine in which the steps of inserting the bearing into a chuck mechanism, holding the bearing in this chuck mechanism during the time the bearing is being operated upon by the tool, releasing the chuck mechanism, removing the bearing therefrom and inserting another bearing, are automatically performed. The invention has among other objects the provision of a novel mechanism for controlling the feeding of the bearing relative to the tool for operating upon the same; the provision of a simple mechanism for clamping the bearing while being operated upon and for subsequently releasing the bearing; the provision of an automatic mechanism for removing the bearing after the chuck mechanism has been released; and the provision of an automatically controlled mechanism for regulating the feeding of the bearings to the chuck mechanism.

With these and other objects in view, the invention resides in the novel features of construction and combinations and arrangements of parts as more fully hereinafter set forth.

In the drawings:

Figure 1 is a perspective view of a machine embodying the invention.

Figure 1ª is a perspective view of a portion of the machine, which in Figure 1 is broken away.

Figure 2 is a plan view thereof;

Figure 3 is a cross section on the line 3—3 of Figure 2 and showing part of the mechanism for controlling the feeding of the bearing toward the tool for operating upon the same;

Figure 4 is a rear elevation of a portion of the machine showing part of the mechanism of Figure 3;

Figure 5 is an end elevation partly in section and showing the bearing feed control mechanism in particular;

Figure 6 is a similar view showing the parts in different positions of adjustment;

Figure 7 is an end elevation of the chuck mechanism;

Figures 8, 9 and 10 are side elevations of the mechanism for removing the bearing from the machine, these figures showing the mechanism in different positions.

1 is the bed of the machine, 2 the head stock preferably integral therewith, and 3 the saddle adjustably mounted thereon. 4 is the boring tool journalled in the head stock and rotated in any usual manner. 5 is the main slide mounted upon the saddle 3 and reciprocable longitudinally of the bed toward and away from the boring tool 4. The main slide 5 is moved or fed toward the boring tool 4 by means of the pinion 6 secured upon the transverse shaft 7 extending through the saddle 3, this pinion engaging the longitudinally extending rack 8 upon the lower face of the main slide. The transverse shaft 7 is adapted to be rotated by means of the hand wheel 9 at the front of the machine and by means of the worm wheel 10 at the rear of the machine. This worm wheel is adapted to be operatively connected to the worm 11 upon the shaft 12 which extends longitudinally of the machine at the rear thereof and is driven from the drive mechanism at the head stock end thereof through a universal joint which permits raising the worm portion of the shaft to engage the worm with the worm wheel and lowering the worm portion of the shaft to disengage the worm from the worm wheel.

For raising the worm 11 into engagement with the worm wheel 10, I have provided the transverse shaft 13 journalled in the saddle 3 and provided with the hand crank 14 at the front of the machine and with the crank 15 at the rear of the machine, this latter crank having a projection 16 engageable with the underside of the projection 17 upon the collar 18 through which the shaft 12 extends. With this arrangement the rocking of the shaft 13 in opposite directions will raise the worm into engagement with the worm wheel or lower the worm out of engagement with the worm wheel.

19 and 20 are cooperating chuck members provided with radially disposed jaws 19' and 20' respectively, having tapered seats for receiving and positioning the ends of a bearing extending between the chuck members, the tapering seats axially positioning the bearing when the chuck members are moved toward each other. The jaws upon one chuck member are staggered with relation to the jaws upon the other chuck member. The chuck member 19 is rigid with the main slide 5 while the chuck member 20 is rigid with the upper slide 21 which is reciprocable longitudinally of the main slide through the connecting rod 22 which is pivotally connected at its head end to the upper slide and at its tail end to the crank 23 upon the vertical shaft 24. This vertical shaft is journalled in the tail end of the main slide 5 and has secured thereto the worm wheel 25 which is housed within the tail end of the main slide. 26 is a worm carried upon the main slide at the front thereof, this worm meshing with the worm wheel 25 and being adapted to be driven through the cone clutch 27. This cone clutch comprises the stationary female driving member 28 and the longitudinally movable male driven member 29, the latter being secured upon the worm shaft which is journalled upon the slide 5. In the present instance, the worm shaft 31 is journalled in the bracket 30 secured to the main slide and forming a housing for the worm. The clutch driving member is mounted upon the shaft 31' journalled upon the bed 1 of the machine and this shaft has secured to its outer end the pulley 32 around which extends the belt 33 driven from the pulley 34 upon the shaft 35. This shaft 35 is also journalled upon the bed of the machine and is driven from the shaft 12 at the rear of the machine by means of the universal joint 36, which permits of raising and lowering the feed worm 11 for actuating the main slide of the machine.

For moving the main slide toward the tail end of the machine upon disengagement of its feed mechanism including the worm 11 and worm wheel 10, I have provided the weight 37 connected to the tail end of the main slide 5 by the cable 38, this cable passing over the pulley wheel 39 journalled upon the bed 1 of the machine. This weight, through the cable, moves the main slide until the male driven member of the clutch engages in the female driving member of the clutch.

For automatically controlling the parts of the machine as thus far described, there is the longitudinally extending rod 40 slidably mounted in the brackets 41 and 42 upon the saddle 3 and the tail end of the main slide 5, respectively. This rod has the transversely bent head end 43 which, upon movement of the rod toward the tail end of the machine is engageable with the hand crank 14 to compel the rotation thereof in a clockwise direction looking at the front of the machine, thereby raising the worm 11 into driving engagement with the worm wheel 10. The longitudinal movement of this rod toward the tail end of the machine is accomplished by means of the latch 44 pivotally mounted upon the crank 23 and having its free end engageable with the detent 45 upon the collar 46 adjustably fixed to the rod 40. 47 is a coil spring surrounding that portion of the rod between the collar 46 and bracket 42 for yieldably resisting the movement of the rod under the influence of the latch. As soon as the hand crank 14 has been rotated to engage the feed worm and feed worm wheel, the main slide 5 is moved toward the head of the machine carrying with it the upper slide 21. The male driven member 29 of the cone clutch is immediately disengaged from the female driving member 28 of the cone clutch, and further rotation of the crank 23 and further actuation of the connecting rod 22 ceases, this occurring preferably when the connecting rod is in alignment with the longitudinal axis of the crank, at which time the chuck member 20 is in nearest proximity to the chuck member 19 to cooperate therewith in firmly engaging and centering the bearing. The main slide and upper slide are then moved as a unit toward the head stock to bring the boring tool into engagement with the bearing and bore the same throughout its entire length and at the completion of the boring the feed worm and the feed worm wheel are disengaged by means of the rod 48 upon the front of the upper slide 21 having the transversely bent tail end 49 engageable with the pin 50 extending transversely from the hand crank 14, whereby the hand crank is rotated in a counter-clockwise direction looking at the front of the machine. During the feeding of the slides as a unit toward the head stock and just prior to the rotation of the hand crank to disengage the feed worm and the feed worm wheel the latch 44 is raised from engagement with the detent 45 by means of the cam 51 upon the saddle 3. This releases the rod 40 so that it can be moved longitudinally toward the head stock of the machine by the coil spring 47, its normal position being dependent upon the coil spring 52 surrounding the tail end of the rod and abutting the bracket 42 and a cotter pin or the like extending transversely through the tail end of the rod.

When the feed mechanism has been released, the weight 37 through the cable 38 returns the main slide, upper slide and associated parts as a unit to the tail end of the bed at which time the detent 45 is advanced toward the head stock of the machine relative to the latch 44. The return of the main slide and upper slide throws the cooperating parts of the cone clutch 27 into driving engagement and thereby rotates the crank 23 through the worm 26 and worm wheel 25 which through the connecting rod 22 moves the chuck member 20 away from the chuck member 19, releasing the bearing. Continued rotation of the crank 23 again brings its latch 44 into engagement with the detent 45 which through the rod 40 trips the hand crank 14 to again throw the feed worm 11 into driving engagement with the feed worm wheel 10 thereby advancing the main slide, auxiliary slide and parts connected thereto. At this time, the chuck member 20 has been advanced toward the chuck member 19 so that the two chuck members firmly engage and center the bearing therebetween.

For the purpose of taking care of different lengths of bearings in the chuck mechanism, the connecting rod 22 has a longitudinally extending slot therethrough in which is located the block for the pivot 53 upon the crank 23 and in which is also located the driving block 54 insertable into the slot between the pivot block and the opposite end of the slot. A different length of driving block is provided for each length of bearing.

55 is a forwardly and downwardly inclined trough mounted upon the bed 1 of the machine at the rear thereof and adapted to receive a number of bearings. This trough is located so that a bearing discharged therefrom will enter the space between the chuck members 19 and 20 when the main slide has been returned to its original position, and also when the chuck member 20 has been moved away or separated from the chuck member 19. In this connection the chuck member 19 is provided with the rods 56 and 57 which are engageable with the lower side of the bearing and serve to temporarily position the same while the chuck members are separated and out of engagement with the bearing.

For allowing of the advance of the bearings one by one into the chuck mechanism at the proper times I have provided the following control mechanism:—58 is a rock arm pivoted at 59 upon the arm 60 carrying the trough. This rock arm has at its free or front end the transversely extending rod 61 which is engageable with the front face of the lowermost bearing. 62 is a second rock arm located above the first-mentioned rock arm and pivotally mounted at 63 upon the bracket 64 secured to the arm 60. This second rock arm has the rod 65 extending toward the front of the machine and provided with the transversely bent portion 66 at its free or front end which is normally located at a point above the bearings in the trough. 67 is a link having a fixed pivotal connection with the rock arm 58 and having a sliding pivotal connection with the lower end of the rock arm 62 at a point below its pivot 63. As shown, this link has the longitudinally extending slot 68 in which the pivot connecting this link to the rock arm 62 is slidable. For normally retaining the parts in position I have provided the coil springs 69 and 70 connected at their upper ends to the brackets 64 and rock arm 62 respectively and at their lower ends to the rearwardly extending lug 58' upon the rock arm 58. With this arrangement, the transverse rod 61 is normally held by the coil spring 69 in its lowermost position in engagement with the front side of the lowermost bearing and the transversely bent free or front end portion 66 of the rod 65 upon the rock arm 62 is held in elevated position, by means of the link 67 connecting the two rock arms. For releasing the lowermost bearing the lower rock arm 58 is provided with the roller 71 which is engageable with the cam 72 upon the upper slide 21 when the main slide 5 has been returned to its original position by the weight 37 and the upper slide has been returned to its original position by the crank 54, at which time the chuck members are spaced farthest apart. This cam through the roller 71 raises the lower rock arm 58, thereby raising the transverse rod 61 to release the bearing and as the lower rock arm is being raised the upper rock arm is actuated by its spring 70 to swing the rod 65 downwardly to bring its transversely bent free end portion into engagement with the bearing immediately above the lowermost bearing before the transverse rod 61 has released the lowermost bearing. As a consequence, the lowermost bearing only is free to drop off the trough. As soon as the cam 72 has become disengaged from the roller 71 which occurs upon the feeding of the main slide and upper slide toward the head stock of the machine, the coil spring 69 again returns the transverse rod 61 to its lowermost position and through the link 67 raises the rod 65 to a position above the bearings so that the bearings move downwardly in the trough and the lowermost bearing engages the transverse rod.

For removing the bearing after the boring operation, I have provided the bracket 73 secured to the rear side of the bed 1 of the machine, this bracket having an arm extending over the machine and provided with a bearing 74 having its axis extending substantially parallel to the longitudinal axis of the machine and in which is journalled the pin 75 having the head 76 at one end thereof. This head is provided with the upwardly extending bifurcations 77 between which is pivoted the arm 78 extending toward the head stock of the machine and provided with the lower and upper fingers 79 and 80 respectively, the lower finger being longer than the upper finger and being adapted to engage in the bore of the bearing while the upper finger is adapted to engage the periphery thereof. The arm 78 is normally held in its downward position by means of the spring 81 coiled around the arm pivot 82 and engaging the upper surface of the arm and one of the bifurcations.

For controlling the swinging of the arm about its pivot I have provided the roller 83 upon the upper slide 21, this roller being engageable with the lower face of the arm. The lower face of the arm is cammed providing at its ends downwardly inclined portions 84 and 85 and intermediate its ends the slightly upwardly concaved portion 86. The arrangement is such that when the main slide feeding mechanism has been released and the main slide 5 is being returned to original position, the roller 83 moving over the inclined end portion 84 of the arm allows the free end of the arm 78 to swing down so that its lower finger 79 will register with the bore of the bearing, the chuck member 20 being spaced from the upright wall of the upper slide 21, which carries the roller 83, a sufficient distance to permit the lower finger of the arm to move between this upright wall and the adjacent end of the upper slide 21. Upon continued return movement of the main slide, the chuck member is separated from the chuck member 19 thereby releasing the bearing whereupon the roller 83 engaging the inclined end portion 85 of the arm compels the upward swinging movement of the arm 78. The pivot of this arm is inclined toward the rear of the machine so that when the arm is raised to a substantially vertical position it is inclined upwardly and rearwardly and the weight of the bearing compels the rearward rotation of the arm about the axis of the stub shaft 75, the arm swinging rearwardly a sufficient distance so that it is inclined downwardly and allows the bearing to slide off the finger 79.

For returning the arm 78 to its normal position there is the coil spring 87 surrounding the pin 75 and located between the bearing 74 and the washer 88 upon the end of the pin opposite its head. This coil spring has one end secured to the bearing and the other end secured to the pin and is so arranged that upon downward and rearward swinging of the arm 78 it will be placed under compression so that when the bearing becomes disengaged from the arm this spring will return the arm to its original approximately vertical position. This return movement is limited by means of the cooperating lugs 89 and 90 respectively upon the bearing 74 and head 76. For guiding the arm and preventing its swinging about the pivot 82 under the influence of the spring 81 until the arm has been returned about the pin 75, there is the rod 91 secured to the rear side of the bed and having an upper end curved forwardly and toward the head stock of the machine, this rod terminating at a point such that when the arm swings downwardly its lower finger 79 will engage the roller 83.

What I claim as my invention is:

1. The combination with a pair of co-acting chuck members, of a sliding support for one of said chuck members, means for reciprocating said support to engage an article between and release it from said chuck members, means for delivering an article between said chuck members, and a member mounted upon said sliding support exercising control of said delivery means through reciprocation of said support.

2. The combination with chuck mechanism for holding an article, comprising relatively movable chuck members, of a tool for operating upon the article, means for feeding said chuck members as a unit toward said tool to bring said tool into engagement with the article, means for controlling the operation of said feed means, means engageable with said control means for releasing said feeding means, means for moving said chuck members as a unit away from said tool to disengage said tool from the article, and means dependent upon the position of one of said chuck members for moving the other of said chuck members relative thereto.

3. The combination with a main slide, of a second slide, chuck mechanism for holding an article including cooperating chuck members upon each of said slides, a tool for operating upon the article, means for moving said slides as a unit toward said tool to engage said tool with the article, means for moving said slides as a unit away from said tool to disengage said tool from the article, means for controlling the movement of said slides, means associated with said control means for moving one of said slides relative to the other to move said chuck members toward and away from each other.

4. The combination with a main slide, of a second slide mounted thereon, chuck mechanism for holding an article comprising cooperating chuck members upon each of said slides, a tool for operating upon the article, feed mechanism for moving said slides as a unit toward said tool to bring the tool into engagement with the article, gravity actuated means for moving said slides as a unit away from said tool to disengage said tool from the article, means controlled by the position of said main slide for moving said second slide relative thereto to move the chuck member upon said second slide away from and toward the chuck member upon said main slide, and means for automatically controlling the movement of said slides.

5. The combination with a slide and means for reciprocating the same, of a member reciprocatory upon said slide, mechanism on said slide for actuating said reciprocatory member said mechanism including a clutch member adapted to be driven, and a coacting driving clutch member stationary as regards reciprocation of said slide and engageable by the clutch member on said slide, in a predetermined position of said slide.

6. The combination with a reciprocable chuck member for holding an article, of a stationary support, and an arm adapted to engage the article and remove the same from the chuck, said arm being pivotally mounted upon said support, and a rotatable member engageable with said arm for moving the same about the pivot.

7. The combination with a reciprocable chuck member for holding an article, of a stationary support, an arm pivotally mounted upon said support adapted to engage the article and remove the same from the chuck member, means for yieldably maintaining said arm in a predetermined position, rotatable means for moving said arm in one direction, and yieldable means for retaining said arm to normal position.

8. The combination with chuck mechanism for holding an article, of a tool for operating upon the article, means for relatively moving said chuck mechanism and tool toward and away from each other to bring the tool into engagement with the article or disengage the tool from the article respectively, an inclined trough for holding a series of the articles, and a pair of members engageable with the lowermost article in said trough and with the article immediately adjacent to the lowermost article, and means for actuating said members to release the lowermost article only and to hold the article immediately adjacent to the lowermost article in said trough, said actuating means including a cam on said chuck mechanism, and a rotatable member carried by one of said members engageable with said cam.

9. The combination with a main slide, of a second slide thereon, chuck mechanism for receiving a bearing or the like comprising cooperating chuck members respectively upon said slides, a tool for boring the bearing or the like, means for moving said second slide relative to said first slide to relatively move said chuck members toward or away from each other and for moving said slides as a unit to bring said boring tool into engagement with the bearing or the like, an inclined trough having its lower end extending adjacent to said chuck mechanism when said main slide has been moved away from said boring tool and said second slide has been moved relatively to said main slide to separate said chuck members, pivotally mounted members engageable with the lowermost bearing or the like in said slide and with the bearing or the like immediately adjacent to the lowermost bearing or the like, a connection between said pivoted members for simultaneously swinging the same in opposite directions, and a cam upon said second slide engageable with one of said pivoted members for actuating the same.

10. The combination with chuck mechanism for receiving a bearing or the like comprising cooperating chuck members relatively movable toward and away from each other, and a pair of rods extending parallel to the axis of said chuck mechanism and arranged to engage the lower periphery of the bearing or the like to temporarily position the same before said chuck members come into engagement with the bearing or the like.

11. In a machine of the character described, a main slide, a second slide mounted upon the main slide, cooperating work holders mounted respectively on said slides, an actuating member for the second slide rotative upon the main slide about an axis transverse to the direction of sliding, drive means for said actuating member fixed relative to travel of said slides, a clutch controlling said drive means, and means for controlling said clutch through travel of the main slide.

12. In a machine of the class described, the combination with a bed and a saddle mounted thereon, of a main slide mounted on the saddle, an upper slide mounted on the main slide, cooperating work holders mounted respectively on said slides, a vertical shaft journaled in the main slide, a crank secured to said shaft and adapted to reciprocate the upper slide, a worm wheel secured to the vertical shaft, a driven shaft, a worm on the driven shaft meshing with the worm wheel aforesaid, a drive shaft, clutch members mounted respectively on said drive and driven shafts for controlling the rotation of the driven shaft from the drive shaft, and a gravity operated means for moving the main slide whereby the clutch members will be operatively connected.

13. In a machine of the class described, the combination with a bed and a saddle mounted thereon, of a main slide mounted on the saddle, a rack carried by the main slide, a transverse shaft journaled in the saddle, a pinion on the shaft meshing with the rack, a worm wheel on the transverse shaft, a drive shaft, a worm on the drive shaft, a shaft journaled in the saddle, a collar on the drive shaft having a projection, a crank secured to the last shaft having a projection engageable with the projection aforesaid for moving the worm into engagement with the worm wheel, and means for rocking the last shaft to cause the worm to engage the worm wheel.

14. In a machine of the class described, the combination with a bed and a saddle mounted thereon, of a main slide mounted on the saddle, a transverse shaft journaled in the saddle, means carried by the transverse shaft for moving said slide, a worm wheel on the transverse shaft, a drive shaft, a worm on the drive shaft, a shaft journaled in the saddle, a collar on the drive shaft having a projection, a crank secured to the last shaft having a projection engageable with the projection aforesaid for moving the worm into engagement with the worm wheel, and a crank for rocking the last shaft to cause the worm to engage the worm wheel.

15. In a machine of the class described, the combination with a bed, and a saddle mounted thereon, of a main slide mounted on the saddle, a transverse shaft journaled in the saddle, means carried by said shaft for actuating said slide, a worm wheel on the transverse shaft, a drive shaft, a worm on the drive shaft, a shaft journaled in the saddle, means adapted to be actuated by the last shaft for moving the worm on the drive shaft into engagement with the worm wheel, a crank for rocking the last shaft to cause the worm to be engaged with the worm wheel, an upper slide mounted on the main slide cooperating work holders mounted respectively on said slides, a crank adapted to actuate said slides, a rod slidably mounted on the saddle and having a head adapted to rock the first-mentioned crank and transversely extending shaft, and means for moving said rod, said means including a latch on the last-mentioned crank including a detent on the rod and a latch on the last-mentioned crank engageable with said detent.

16. In a machine of the class described, the combination with a bed and a saddle mounted thereon, of a main slide mounted on the saddle, a transverse shaft journaled in the saddle, means carried by the transverse shaft for moving the main slide in one direction, gravity operated means for moving the main slide in another direction, a worm wheel on the transverse shaft, a drive shaft, a worm on the drive shaft, a second shaft journaled in the saddle, means adapted to be operated by the second shaft for moving the worm on the drive shaft into engagement with the worm wheel, an upper slide mounted on the main slide, cooperating work holders mounted respectively on said slides, and a member on the upper slide adapted to rock the crank and transverse shaft aforesaid to cause the worm to be disengaged from the worm wheel whereby the gravity operated means may return the main slide to normal position.

17. In a machine of the class described, the combination with a bed, of a main slide mounted on the bed, an upper slide mounted on the main slide, cooperating work holders mounted respectively on said slides, a bracket secured to the bed, a pin carried by the bracket, an arm pivoted on the pin having means for removing a bearing from the work holders, said arm having a cammed portion, a rotatable member engageable with the cam portion of said arm for receiving the same, and yieldable means for returning the arm to normal position.

18. In a machine of the class described, the combination with a bed, of a main slide mounted on the bed, an upper slide mounted on the main slide, cooperating work holders mounted respectively on said slides, a bracket secured to the bed, a pin carried by the bracket, an arm pivoted on the pin having means for removing a bearing from the work holders, said arm having spaced cammed portions, and a rotatable member engageable with said cammed portions for alternately lowering said arm to engage the bearing and raising said arm to remove the bearing from the work holders.

19. In a device of the character described, a slide, a work holder carried by said slide, a tool for operating upon the work in said holder, feed mechanism for advancing said slide toward said tool to engage the work with said tool, means for automatically releasing the slide from its feed mechanism in a predetermined position of said slide, means for automatically retracting the slide from said tool upon release of the slide from said feed mechanism, and means for automatically releasing the work from said holder in the retracted position of said slide.

20. The combination set forth in claim 5, the second slide being mounted upon the main slide for travel parallel to that of the main slide.

21. The combination with a chuck member reciprocatory to release an engaged article, of a support stationary as regards travel of said chuck member, an arm for engaging said article pivotal upon said support to swing alternatively about relatively transverse axes, and a member reciprocatory in unison with said chuck member for swinging said arm and the engaged article about one of said axes to a raised position, said arm being movable about its other pivotal axis for releasing the article.

22. The combination with a chuck member reciprocatory to release an engaged article, of a support stationary as regards travel of said chuck member, an arm pivotal upon said support for engaging the released article and removing it from its chucking position and a member reciprocatory in unison with said chuck member for exercising a control of said arm.

In testimony whereof I affix my signature.

WILLIAM J. FIEGEL.